Dec. 19, 1939.                C. ORT                2,184,018
                         LENS ATTACHMENT
                      Filed Sept. 23, 1937
FIG. 1
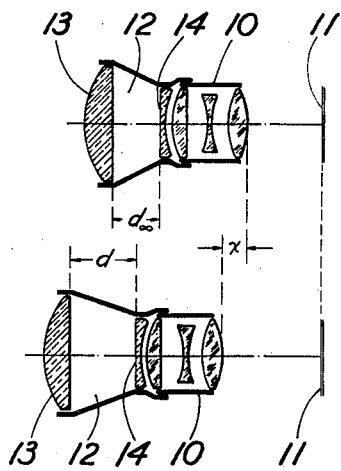
FIG. 3
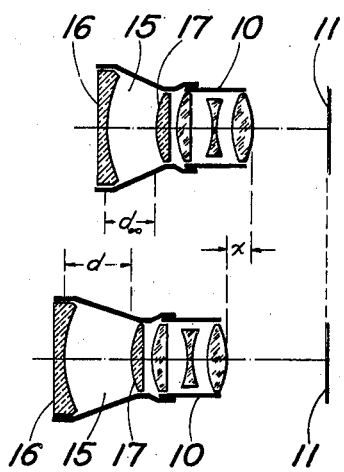
FIG. 2                                    FIG. 4
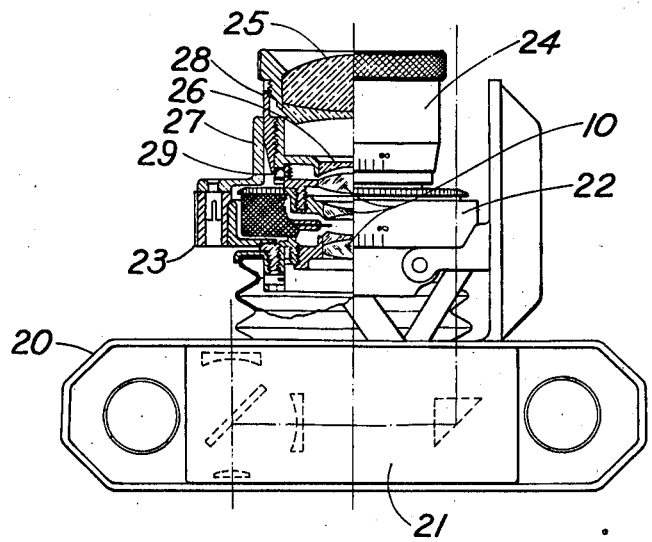
FIG. 5
Carl Ort
INVENTOR.
BY Newton M. Perrins
   Rolla H. Carter
ATTORNEYS Patented Dec. 19, 1939

2,184,018

UNITED STATES PATENT OFFICE 2,184,018

LENS ATTACHMENT

Carl Ort, Stuttgart, Germany, assignor to Eastman Kodak Company, Rochester, N. Y., a corporation of New Jersey Application September 23, 1937, Serial No. 165,355
In Germany April 8, 1937

8 Claims. (Cl. 95—45)

This invention relates to photographic cameras. It relates particularly to auxiliary lens attachments designed to alter the effective focal length of normal photographic objectives employed on cameras.

It is an object of the invention to provide an auxiliary lens system which may be mounted in front of an ordinary photographic objective to give an increased or decreased effective focal length. That is, to provide means whereby an ordinary objective may be modified to function as a telephoto or wide angle system as desired.

Such auxiliary systems have been known for many years. Fundamentally, they comprise a collective lens component and a dispersive lens component forming a Galilean telescope, an inverted Galilean telescope or an approximation thereto. A Galilean telescope or an inverted Galilean telescope is said to be an afocal system since its focal plane is at infinity.

If an afocal system is mounted in front of an ordinary photographic objective focused for infinity, the combined system is focused for infinity and need not be altered. That is, an afocal system, receiving light from an object at infinity, presents a virtual image also at infinity. However, for an object at a finite distance, say 25 feet, such a system would give a virtual image not coincident with the object, for example, a Galilean telescope presents a virtual image at a distance somewhat less than the object distance.

It is an object of my invention to provide a lens system which may be used with an ordinary photographic objective without altering the effect of the focusing mechanism of the objective. I have found that by increasing the separation between the collective and dispersive components of an afocal system, the object and virtual image planes can be caused to remain coincident as the object distance changes from infinity to a finite one. It is well known that, due to depth of focus, distant objects may be considered at infinity. Thus, the term finite is here used in a relative sense to mean distances less than say 100 feet.

It is an object of the invention to provide an auxiliary lens attachment comprising a collective component and a dispersive component and means for adjusting the axial separation of these components. It is a further and special object of the invention to provide an arrangement for coupling this adjusting means to the focusing mechanism of the camera objective to actuate the adjusting means so that the auxiliary attachment has coincident object and virtual image planes at the distance corresponding to the setting of the camera objective focusing scale. An object and its image whether real or virtual are said to be at conjugate distances with respect to a lens and the object and image planes are called conjugate planes.

When a camera is provided with a range finder having its light-deviating means coupled with the lens focusing mechanism in any of the well-known manners, the range finder adjustment corresponds to the setting of the objective focusing scale and is not cognisant of the presence or absence of any auxiliary lens system. According to my invention, there is provided for the first time, a simple and convenient auxiliary lens attachment which does not interfere with the objective focusing mechanism and, hence, does not interfere with any coupled range finder system.

My invention also finds many useful applications in fields such as news cinematography, where it is often desirable to change from a distant to a close-up view of some event. Other objects and advantages of my invention will be apparent from the following description, when read in connection with the accompanying drawing in which:

Fig. 1 is a conventional showing of the invention applied to an objective focused on infinity;

Fig. 2 shows the same form focused at a finite distance;

Fig. 3 is a conventional showing of another form of the invention focused on infinity;

Fig. 4 shows the form shown in Fig. 3 adjusted to be focused at a finite distance;

Fig. 5 shows in detail the embodiment of the invention which is shown schematically in Fig. 1 as applied to an ordinary folding camera and further shows one embodiment of a very special feature of my invention, namely, the coupling device connecting the attachment adjusting means and the lens focusing member.

In Fig. 1, an ordinary photographic objective 10 is focused on infinity with respect to the image plane 11 (film plane). An auxiliary attachment 12 comprising a collective component 13 spaced in front of a dispersive component 14 is mounted immediately in front of the objective 10. As shown in this figure the components 13 and 14 are separated by the algebraic sum of their focal lengths and, hence, the system 12 is an afocal system. It is to be understood that this is just a schematic illustration of my invention and that the lenses 13 and 14 may be compound to correct for aberrations in the usual way. The separation between the components 13 and 14 is labeled $d\infty$.

In Fig. 2, the photographic objective 10 has been moved forward a distance X, so that with respect to the image plane 11, the objective 10 is focused on a nearby subject at an object distance of say 25 feet. The spacing between the components 13 and 14 of the auxiliary lens system 12 has been increased to the value $d$ so that the whole optical system including the camera objective 10 and the attachment 12 is focused on 25 feet. That is, the auxiliary attachment 12 has coincident conjugate planes at 25 feet and thus presents a virtual image at this distance. A simple mathematical formula by which $d$ may be computed is as follows:

$$\frac{1}{U_1}+\frac{1}{V_1}=\frac{1}{f_1}$$

where $U_1$, $V_1$, $f_1$ are the object distance, image distance and focal length of lens 13.

$$\frac{1}{U_2}+\frac{1}{V_2}=\frac{1}{f_2}$$

where $U_2$, $V_2$, $f_2$ correspond to lens 14

$$d=V_1+U_2=\frac{U_1 f_1}{U_1-f_1}+\frac{V_2 f_2}{V_2-f_2}$$

In any specific case $f_1$ and $f_2$ are known or can be measured, $U_1$ and $V_2$ are the object and image distances (approximately) for the whole attachment 12 or at least must be approximately equal and opposite if the conjugate planes are to be coincident. For example $U_1=-V_2=25$ feet in the case discussed above.

Thus $d$ may be computed and any suitable mechanism may be provided to control the adjustment of the axial spacing between the two components. This mechanism will preferably be any system of gears, spiral slots and pins or a simple screw threaded system. Since a screw threaded system is the most convenient and practical to use commercially, it is the only system which I have described in detail, as shown in Fig. 5, but it is to be understood that any of the equivalent gear systems and methods of controlling the gear ratio between the movement of the adjusting member and the change in axial separation of the components, may be employed.

The arrangement shown in Figs. 1 and 2 gives an increased effective focal length; a similar arrangement giving a wide angle effect is shown in Figs. 3 and 4, wherein the auxiliary attachment 15 comprises a negative lens 16 in front of a positive component 17. Due to the similarity of this arrangement to that shown in Figs. 1 and 2, a detailed description thereof would be mere repetition.

In the arrangement shown in Fig. 5, the camera objective 10 is mounted in a rotatable focusing mount 22 which is provided with a focusing knob 23 in a well-known manner. On the camera housing 20, a range finder 21 is mounted whose light deviating means may be coupled to the focusing mount 22 in any well-known mechanical or optical manner not shown. An auxiliary lens attachment 24 similar to that shown in Figs. 1 and 2 is provided with a collective component 25, a dispersive component 26 and any convenient means whereby it may be rigidly attached to the camera objective mount 22. It is arranged so that the axial spacing of the lens 26 from the objective 10 remains constant. A screw threaded means 28 is provided for adjusting the axial separation of the components 25 and 26.

The focusing knob 23 and the adjusting means 28 may be separately and independently operated to set the objective and auxiliary lens for a desired distance, but I prefer to couple them for simultaneous operation as by having this adjustment controlled by a coupling member 27 secured to the mount of the component 25. The coupling member 27 is so formed that it rigidly engages the focusing knob 23 of the camera. The attachment 24 is provided with a pin and slot connection 29, so positioned that when it is attached to the objective mount 22, with the coupling member 27 engaging the focusing knob 23, the components 25 and 26 form an afocal system when the objective 10 is focused on infinity and when the knob 23 is turned to focus the objective for a nearby object, the coupling member 27 and the screw threaded member 28 are turned increasing the axial spacing between the components 25 and 26. Thes crew threaded member 28 is so pitched that the object and image distances of the attachment 24 are coincident at the distance corresponding to the setting of the camera focusing mount.

It is thus seen that the auxiliary lens of the invention does not affect the distance for which the normal objective is focused and that the positioning pin 29 and the coupling member 27 require that the auxiliary lens be adjusted to correspond to the focus setting of the normal objective in order that it may be properly mounted thereon. It is evident also that a scene may be photographed at one magnification and then at a different magnification without the necessity or inconvenience of refocusing the camera.

It is obvious that any type of coupled range finder, any type of focusing mechanism and any type of adjustment mechanism on the attachment may be employed, provided that a coupling gear system equivalent to the screw threading system described is employed. However, the convenience of the particular arrangement of the focusing mechanism 23, the attachment adjustment means 28 and the coupling member 27 is a very desirable feature and, hence, this is the preferred embodiment of the invention.

Having thus described the principle of my invention, the manner in which it may be applied to various lens systems, and one particularly attractive embodiment of it, I wish to point out that it is not limited to the specific structures but is of the scope of the appended claims.

What I claim and desire to secure by Letters Patent of the United States is:

1. In combination with a camera, an objective, a mount therefor, a movable member for focusing the objective, an auxiliary lens attachment comprising a collective component, a dispersive component, mounts therefor and means secured to said component mounts for adjusting the axial separation of the components, means detachably securing the attachment to the objective mount and means coupled to the focusing member for adjusting said auxiliary lens attachment in coordination with the focusing movement of said objective, the coordination of said coupling means being so geared that focusing said objective to a setting corresponding to a certain distance varies said axial separation of the auxiliary lens component by an amount such that the combined optical system including both the camera objective and the auxiliary lens, is focused on a subject at that certain distance.

2. The combination of a camera, a camera objective, means for focusing the objective, a range finder mounted on the camera and coupled to the focusing means, an auxiliary lens system mounted in front of the objective comprising a positive and a negative lens component, means for varying the axial separation of said components and means coupling said varying means and said focusing means, said coupling means being so geared that focusing said objective to a setting corresponding to a certain distance varies said axial separation of the auxiliary lens components by an amount such that the combined optical system including both the camera objective and the auxiliary lens, is focused on a subject at that certain distance.

3. The combination of a camera, a camera objective, a focusing mount rotatably supporting the objective, an auxiliary lens system mounted in front of the objective comprising a collective and a dispersive component, rotatable adjusting means supporting said components for varying the axial separation thereof and means rigidly coupling said rotatable adjusting means and said rotatable focusing mount, said adjusting means being geared to give for each setting of the focusing mount, an axial separation such that the auxiliary lens system has coincident object and image planes at the distance corresponding to that setting.

4. An auxiliary lens attachment adapted to be mounted in front of the objective of a camera having a focusing member, said attachment comprising a collective lens component, a dispersive lens component, mounts for said components, adjusting means connecting said mounts for varying the axial separation of the components, attaching means for mounting the attachment in front of the camera objective and coupling means so coupling said adjusting means and said focusing member that the attachment is an afocal system when the camera is focused for infinity and adjustment of the focusing member from the infinity position to another setting alters said axial separation and changes the attachment from an afocal system to one having coincident object and image planes at the distance corresponding to said setting.

5. A lens attachment for a camera having a rotary focusing objective mount and a focusing knob therefor, said attachment comprising a collective lens component, a dispersive lens component, mounts for said components, attaching means for detachably securing one of said mounts to the camera objective mount, screw-threaded means permitting relative rotation of the component mounts for varying the axial separation of the components, and coupling means detachably and rigidly connecting said screw-threaded means and said focusing knob, said screw-threaded means being so pitched that a rotation of the focusing knob and coupling means sufficient to change the camera focus from the infinity setting to another object distance, varies said axial separation sufficient to change the attachment from an afocal system to one having coincident object and image planes at that object distance.

6. In combination with a camera, an objective, an objective mount therefor, means for setting the focus of the objective, an auxiliary lens attachment comprising a collective component, a dispersive component and mounts therefor, means on said component mounts operated by said focusing setting means for adjusting the axial separation of the components to give coincident conjugate planes at a distance corresponding to the setting of the camera focus.

7. In an optical system a photographic objective comprising a collective lens system, means for focusing the system and a member detachable from the front thereof, said detachable member comprising a collective component, a dispersive component, component mounts therefor and means on said mounts coupled to and operated by said focusing means for adjusting the axial spacing of the components to give coincident object and image planes conjugate with respect to the detachable member at the object plane for which the collective lens system is focused.

8. The combination of a camera, an objective, a mount therefor, a focusing member engaging the mount to focus the camera over a given range of settings including infinity, an auxiliary lens attachment comprising a collective component, a mount therefor, a dispersive component, a mount therefor, adjusting means connected to the component mounts for varying the axial spacing of the components to give coincident conjugate planes at various distances from the attachment and means actuated by the focusing member for correspondingly adjusting the attachment whereby said distances are made to correspond to the setting of the focusing member.

CARL ORT.